(12) United States Patent
Montaner Fragüet et al.

(10) Patent No.: US 7,770,343 B2
(45) Date of Patent: Aug. 10, 2010

(54) PREFABRICATED MODULAR TOWER

(75) Inventors: Jesús Montaner Fragüet, Huesca (ES); Antonio Ricardo Mari Bernat, Huesca (ES)

(73) Assignee: Structural Concrete & Steel, S.L., Huesca (ES)

( * ) Notice: Subject to any disclaimer, the term of this patent is extended or adjusted under 35 U.S.C. 154(b) by 357 days.

(21) Appl. No.: 11/911,682

(22) PCT Filed: Apr. 20, 2006

(86) PCT No.: PCT/ES2006/000194
§ 371 (c)(1),
(2), (4) Date: Dec. 10, 2007

(87) PCT Pub. No.: WO2006/111597
PCT Pub. Date: Oct. 26, 2006

(65) Prior Publication Data
US 2008/0209842 A1    Sep. 4, 2008

(30) Foreign Application Priority Data
Apr. 21, 2005    (ES) ................. 200500965

(51) Int. Cl.
*E04H 12/12* (2006.01)
*E04H 12/16* (2006.01)
*F03D 11/04* (2006.01)
(52) U.S. Cl. ............. 52/223.5; 52/249; 52/649.2; 52/843; 52/848; 416/DIG. 6
(58) Field of Classification Search ............... 52/223.4, 52/223.5, 649.2, 649.3, 245, 437, 249, 40, 52/843, 845, 848; 416/DIG. 6, DIG. 8
See application file for complete search history.

(56) References Cited

U.S. PATENT DOCUMENTS

| | | | | |
|---|---|---|---|---|
| 1,031,050 | A | * | 7/1912 | Conzelman ............ 52/247 |
| 1,050,130 | A | * | 1/1913 | Harvey ............ 52/583.1 |
| 1,194,305 | A | * | 8/1916 | McMillan ............ 52/245 |
| 2,483,175 | A | * | 9/1949 | Billner ............ 264/101 |
| 2,958,983 | A | * | 11/1960 | Hoover ............ 52/396.02 |

(Continued)

FOREIGN PATENT DOCUMENTS

DE    2508470    2/1975

(Continued)

OTHER PUBLICATIONS

Wind Blatt, The Enercon Magazine, Issue Mar. 2001, Enercon Gmbh, Aurich, Germany.

*Primary Examiner*—Robert J Canfield
(74) *Attorney, Agent, or Firm*—Notaro, Michalos & Zaccaria P.C.

(57) ABSTRACT

Prefabricated modular tower of the kind used as a support for wind generators and other applications uses reduced-thickness prefabricated elements which are reinforced with an internal structure of horizontal and vertical stiffeners, preferably made of reinforced concrete. The elements are tensioned both horizontally and vertically by flexible metal cables. The main advantages of the invention are that it enables fast construction of very high towers using a limited number of elements. The elements are not heavy and are easy to transport, all of which leads to savings in manufacturing, transport and installation costs.

15 Claims, 14 Drawing Sheets

U.S. PATENT DOCUMENTS

| | | | |
|---|---|---|---|
| RE27,732 E * | 8/1973 | Van Buren | 52/223.4 |
| 4,077,174 A * | 3/1978 | De Leaumont | 52/259 |
| 5,038,540 A * | 8/1991 | Krautz | 52/245 |
| 2008/0040983 A1* | 2/2008 | Fernandez Gomez et al. | 52/40 |
| 2009/0031639 A1* | 2/2009 | Cortina/Cordero | 52/40 |

FOREIGN PATENT DOCUMENTS

| | | | |
|---|---|---|---|
| DE | 19936603 | | 2/2001 |
| ES | 1058539 | | 10/2004 |
| JP | 200100658 | | 7/2002 |
| JP | 2004-11210 | * | 1/2004 |
| JP | 2004011210 | | 1/2004 |
| JP | 2008-248476 | * | 10/2008 |
| WO | WO03069099 | | 8/2003 |

* cited by examiner

PREFABRICATED MODULAR TOWER

As its title indicates, the present descriptive report refers to a prefabricated modular tower of the kind used as a support for wind generators and other applications, characterised in that it uses reduced-thickness prefabricated elements, reinforced with an internal structure of horizontal and vertical stiffeners, preferably made of reinforced concrete; said elements being tensioned both horizontally and vertically by means of flexible metal cables.

At present there is a wide range of kinds of wind-powered electricity generators, which are also known as wind generators. These generators comprise a turbine connected to blades that is supported on a tower.

Most of the more commonly used generator support towers are metal and either have a lattice structure or a cylindrical or hollow tapered shape. These kinds of towers present a series of problems, among which we would mention the need for frequent maintenance with anti-rust treatments or paint, their short service life, which is usually less than 20 years due to exhaustion caused by material fatigue (because of the constant traction and compression cycles caused by the force of the wind they have to withstand) and the high manufacturing, transport and installation costs.

An additional problem is the fact that they can only be used, from both the technical and economic viewpoint, for heights between 25 and 40 m. For heights over 50 m metal towers begin to be unfeasible, both because of their rigidity for withstanding stress and the high cost of the material involved, which greatly restricts the height of the wind generators.

Current wind generator building trends are veering towards an increase in their power and much higher positioning of the turbine and the blades. Turbines are also being equipped with much larger blades in order to avoid the screen effect of mountains and in an endeavour to make use of the higher air layers where the flow is more constant and power production therefore much greater.

This means that tower-building alternatives must be found to cater for heights well above 50 m and in fact closer to 90 or 100 m. The rigidity required means that it is no longer feasible to build these towers with metal structures and for this reason attempts have been made to build them with reinforced concrete, which is much more rigid and resistant and also far more economical.

Some towers are built on site using casing in the form of latticework or a similar structure, just as buildings and skyscrapers are, but this has the disadvantage of being a slow, costly process, particularly due to the labour costs involved. An example of this building technique can be found in patent JP 200100658 "Very tall tower" or in patent DE 19936603 "Structural engineering method for hollow mast or concrete structure as a tower, for example, for a wind farm, comprising a guide structure for work used during the construction installed in the inside space".

Attempts have been made to find other solutions. For example patent WO 2004007955 "Method for the production of a cement segment for a wind farm tower" presents a construction system using full stackable tapered segments made in a prefabricated concrete factory and transported to the site, which has the problem that the segments have to be quite short if they are to be transported using conventional road transport methods, with all the relevant legal and practical limitations, which means that they have to use a very large number of stacked segments to make the tower, which generates high transport and labour costs, which are coupled with the cost of the constant use of cranes for installation and assembly. An added disadvantage of this method is the fact that, to build a tapered tower, each segment has different measurements, which means that there have to be as many moulds as there are segments in the tower, which increases the complexity of the production process. Furthermore, to achieve the necessary rigidity and solidity, the segment walls must be considerably thick, which increases their cost and the weight to be transported.

In an endeavour to reduce the size of the parts to be transported attempts have been made to divide each tapered mast segment into separate pieces as described in Utility Model 200402304 "Improved modular tower structure for wind turbines and other applications", and in Patent W003/069099 "Wind Turbine", but both have the disadvantage of using very thick solid walls that are smooth both inside and outside in order to achieve structural rigidity and resistance, which puts up the price of the items considerably and also means that a large number of pieces are required to build the tower, with the consequent high cost both in terms of transport and assembly, apart from the high manufacturing cost generated by the large number of manufacturing moulds needed and the high structural weight involved.

In addition, towers are known, such as that described in Utility Model 200402504 "Perfected structure of a modular tower for wind turbines and other applications", which have in common with the others the fact that they use separate pieces to form the segments in which, to achieve the structural stiffness and resistance, solid walls of a considerable thickness are used, these being smooth on the inside and outside. Given the notable increase in weight of the pieces this produces the same problem as when a large number of pieces are needed to form the tower, with a high economic cost of both transport and assembly. Moreover, to reinforce the structure of the tower, this embodiment employs an external pre-tensioning system consisting of vertical tensioning cables that have the problem of having to be attached to the foundations of the tower, which must therefore be equipped with appropriate anchorages, also presenting the problem that the cables are only attached to the walls at the through-holes of the flanges on said walls, meaning that there is only partial contact with walls and that the reinforcement is therefore fairly poor. Moreover, most of the cables are left outside the wall, on the inside of the tower, and exposed to the air, which causes a negative visual impact as well as the added problem of deterioration that is caused by the stressing effort of the cables together with atmospheric wear and corrosion that enormously limits their useful life.

The prefabricated modular tower that is the subject of the present invention was designed to solve the problems involved in the current issue of building very tall support towers for wind generators and other applications. It uses reduced-thickness prefabricated elements that are reinforced with an internal structure of horizontal and vertical stiffeners made preferably of reinforced concrete; the elements are tensioned both horizontally and vertically by means of flexible metal cables.

The tower is divided into a small number of tapered parts, each of which is, in turn, formed by the lateral coupling of a reduced number of identical prefabricated modular elements made preferably of reinforced concrete. In a preferred embodiment example, the tower is divided into three tapered parts with a height of approximately 30 to 35 m each, which gives a total tower height of approximately 100 m. In this preferred embodiment example, the lower part is formed of 5 identical prefabricated modular elements placed alongside one another: the intermediate part is formed by a further 5 identical prefabricated modular elements, although obviously of smaller diameter than those referred to above, which are also placed alongside one another; the upper part is formed by only 3 prefabricated modular elements, which are the same as one another but different from the previous ones. This preferred embodiment example shows us how a 100 m tall tower is made using only 13 prefabricated modular elements of only 3 different kinds and therefore requiring only 3 manufacturing moulds.

Each of the prefabricated modular elements is the right shape to form a tapered part of the tower when placed adjacently. Their external wall is smooth while the internal wall has numerous prominent horizontal and vertical reinforcement stiffeners that allow the main wall of the modular elements to be of limited thickness, while still providing high rigidity and resistance and thus leading to a considerable reduction in the weight of the prefabricated modular element. The vertical sidewalls, of a reduced width, have a groove all the way up, preferably of trapezoidal section, intended for the cement union joint.

The horizontally-arranged reinforcement stiffeners each have a central longitudinal tube running all the way along them, through which the tensioning cables, preferably flexible and made of steel, are passed. They provide horizontal solidarity between the prefabricated modular elements that make up each part of the tower, thus helping to increase overall rigidity and stability. This solidarization will be achieved preferably by dividing each horizontal run into two cable sections, instead of having only one, so as to tense the cables more easily by means of the relevant jacks or similar tools. For this purpose, the prefabricated modules will have appropriate openings providing access to the horizontal central tubes.

When the prefabricated modular elements that make up each part of the tower have been placed alongside one another and the horizontally arranged tensioning cables have been tensed, the vertical union joints between each pair of modular elements will be closed, first sealing the joint from the outside and inside by means of a closure seal and subsequently pouring a sealant, preferably of the liquid cement type, into the gap formed by the lateral grooves of the adjacent modular elements, which, when it sets will contribute to the solidity of the unit.

The prefabricated modular elements also have a plurality of through-tubes arranged vertically on the wall and completely integrated in it, for the purpose of passing through them the preferably flexible, tensioning steel cables that provide vertical solidarization of the parts comprising the tower. These vertical tensioning cables will be installed from the lower stiffener of the prefabricated modular elements that form the lower part of the tower, passing through the through-tubes which are subsequently filled with mortar that secures and integrate the cables inside the through-tubes and hence inside the walls, being concealed both internally and externally and completely solidarized with the towers. Said cables are installed in groups of one cable per tower part (three cables in the preferred embodiment example), in such a way that the first cables in each group will be tensioned above the joint between the first part and the second part; the second cables of each group will be tensioned above the joint between the second part and the third part and so on. In this way, they help to tension the tower as a whole, all the way up. The through-tubes are subsequently filled with mortar and another similar element. The vertical cables are, in this way, totally integrated in the tower walls, contributing to its rigidity but remaining concealed from sight, both inside and outside the tower.

As well as using the vertical tensioning cables for this purpose, the joining of the different parts that make up the tower vertically will be carried out using common jointing methods in prefabricated concrete products, such as bridle joints or a receptacle filled with liquid cement, protected by a gutter to keep rainwater out. A feature of the invention is that the vertical components of the tower will be assembled on top of one another with a horizontal rotation equivalent to the angle distance that separates two vertical reinforcement stiffeners from one another, so that the vertical jointing grooves on each part between the prefabricated modular elements do not coincide vertically, without altering the perfect support between the vertical stiffeners, thus improving its insulation against water. For each prefabricated modular element there will preferably be two complete vertical stiffeners and two semi-stiffeners at the ends, which, when joined together, form the equivalent of one stiffener, in order to make this rotation possible.

The joining of the base of the first part of the tower with the foundation is carried out by means of conventional foundation-building and anchorage techniques used in construction, such as screwing down with rigid bars or similar, appropriately dimensioned in line with the size of the tower.

The last part of the tower can be linked to another prefabricated concrete or metal section of the tower or it can directly support the wind generator enclosure and the blade support structure.

The prefabricated modular tower presented has numerous advantages over currently available systems, the most important of which is to enable very tall towers to be constructed quickly using a reduced number of elements. In the preferred embodiment example one can see how a tower some 100 m tall is built using only 13 prefabricated modular elements, of which there only need to be 3 different kinds, thus requiring only 3 different manufacturing moulds.

Another considerable advantage is that, because the prefabricated modular elements are equipped with reinforcement stiffeners, they weigh considerably less, which facilitates transport and therefore provides savings in manufacture, transport and installation costs.

It is important to underline the unquestionable advantage of the fact that, in the preferred embodiment example the dimensions of each of the prefabricated modular elements are calculated according to their approximate length, which is between 30 and 35 m, while the maximum width of each element is 4.5 m to make normal road transport possible. Given that the remaining measurement is usually about 70 cm, temporary reinforcement in the form of metal latticework can be put in place to support parts during transport or during assembly on the site.

Another advantage of the present invention is that the entire tower is perfectly tensed by cables both horizontally and vertically.

Attention must be drawn to the important advantage of the vertical cables being totally integrated in the tower walls, passed through the through-tubes inserted in the walls and subsequently filled with mortar, contributing to their rigidity, but remaining concealed both on the inside and outside of the tower, which also greatly improves the duration of the cable since contact with the exterior and atmospheric degradation is avoided.

For a better understanding of the subject of the present invention, a practical preferred embodiment of a prefabricated modular tower such as the one described above has been represented in the attached drawing.

In this drawing

Figure 1:
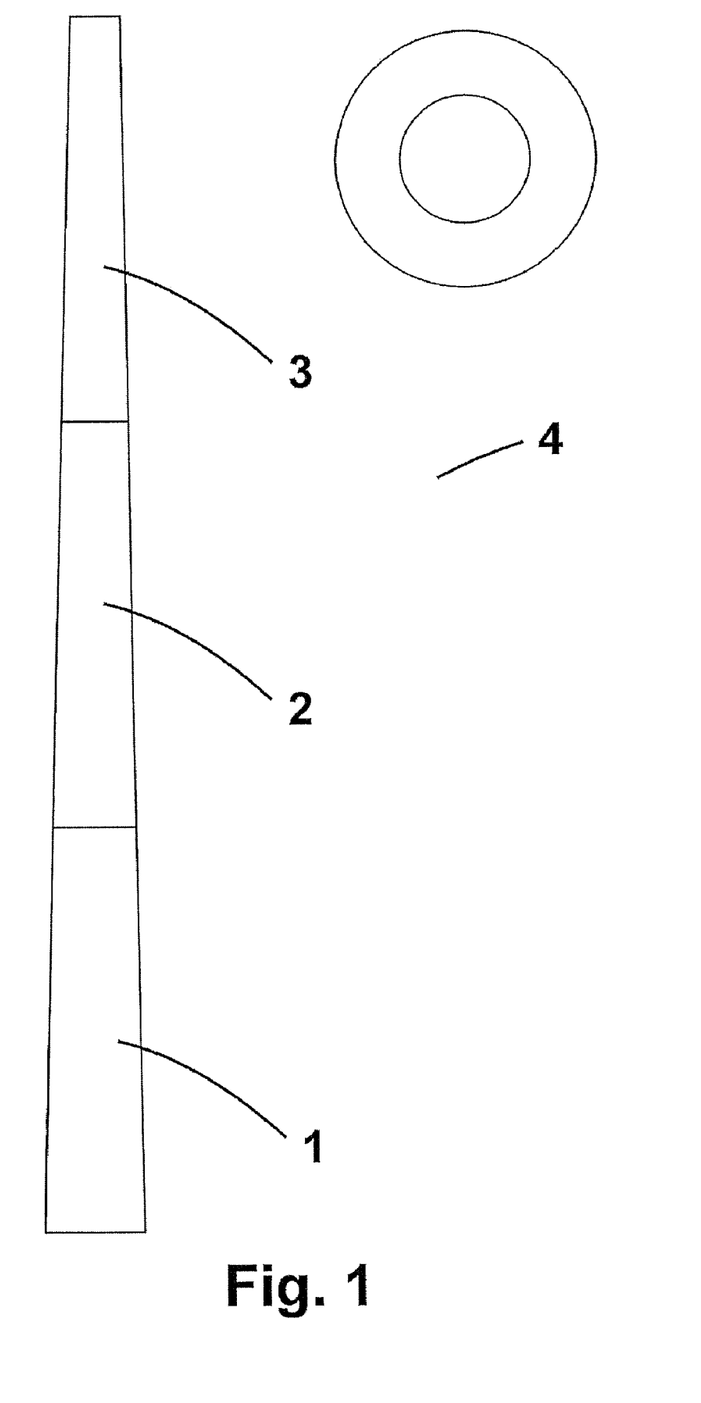
FIG. 1 shows an elevation and plan view of the tower in which the three parts comprising it can be seen.

As can be seen in the attached drawing, the prefabricated modular tower (4) that is the subject of the present invention, basically comprises a small number of tapered parts (1,2,3), each of which (1,2,3) is in turn formed by the lateral union of a small number of identical prefabricated modular elements (6,7,8) preferably made of reinforced concrete. In a preferred embodiment example, the tower (4) is divided in three tapered parts (1,2,3), with an approximate height of 30 to 35 m in each part, which gives a total tower height of approximately 100 m. In this preferred embodiment example the lower part (1) is formed by 5 identical prefabricated modular elements (6) placed alongside each other; the intermediate part (2) is formed by a further 5 identical prefabricated modular elements (7), although of smaller diameter than the previous ones, which are also placed alongside one another and the upper part (3) is formed by only 3 prefabricated modular elements (8), which are the same as one another but different from the previous ones.

Figure 2:
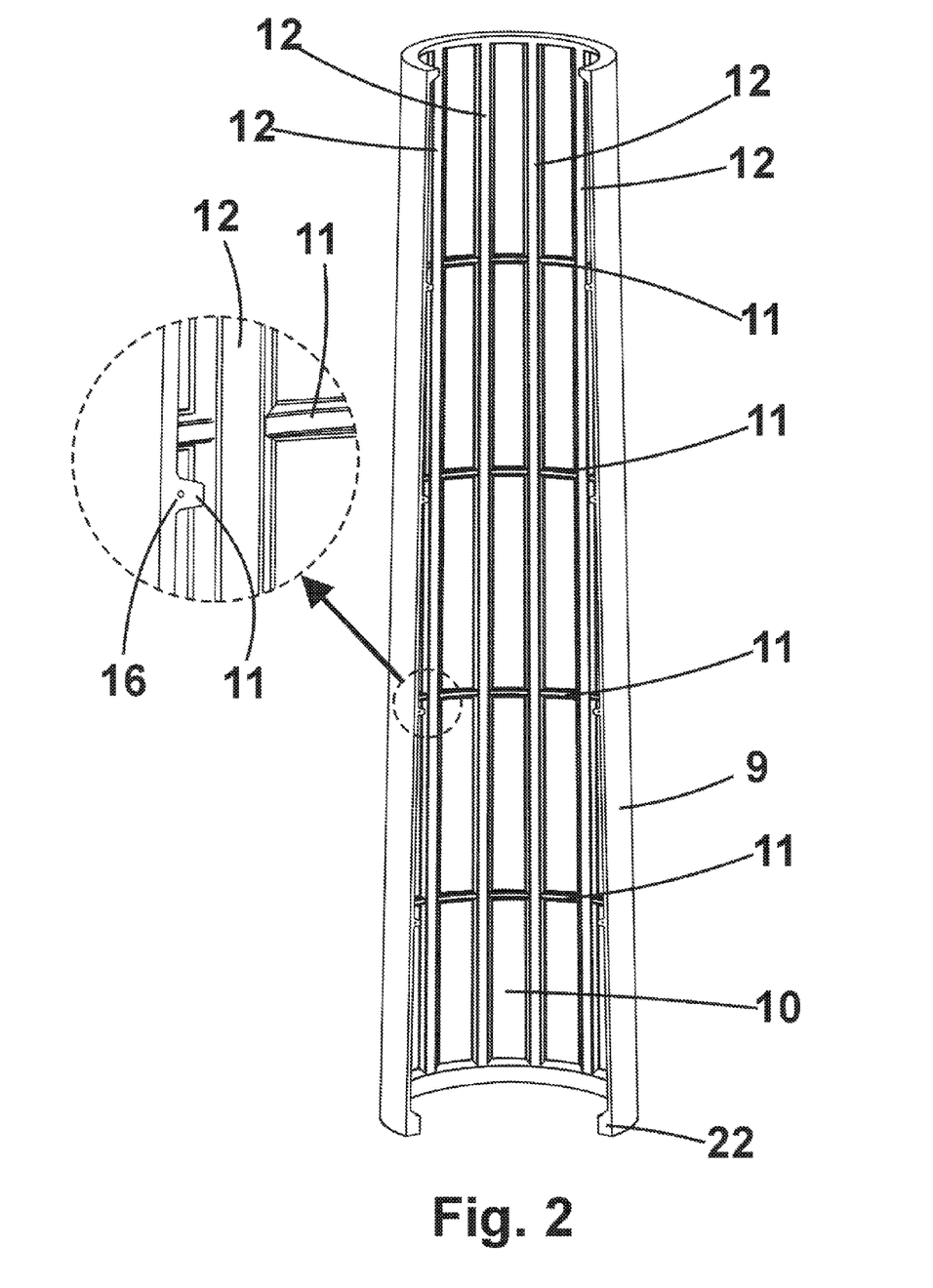
FIG. 2 shows a partial view of one of the parts of the tower that has not been fully closed, showing the internal stiffeners and an enlarged detailed view of them showing the internal tube of the horizontal stiffeners.
Figure 3:
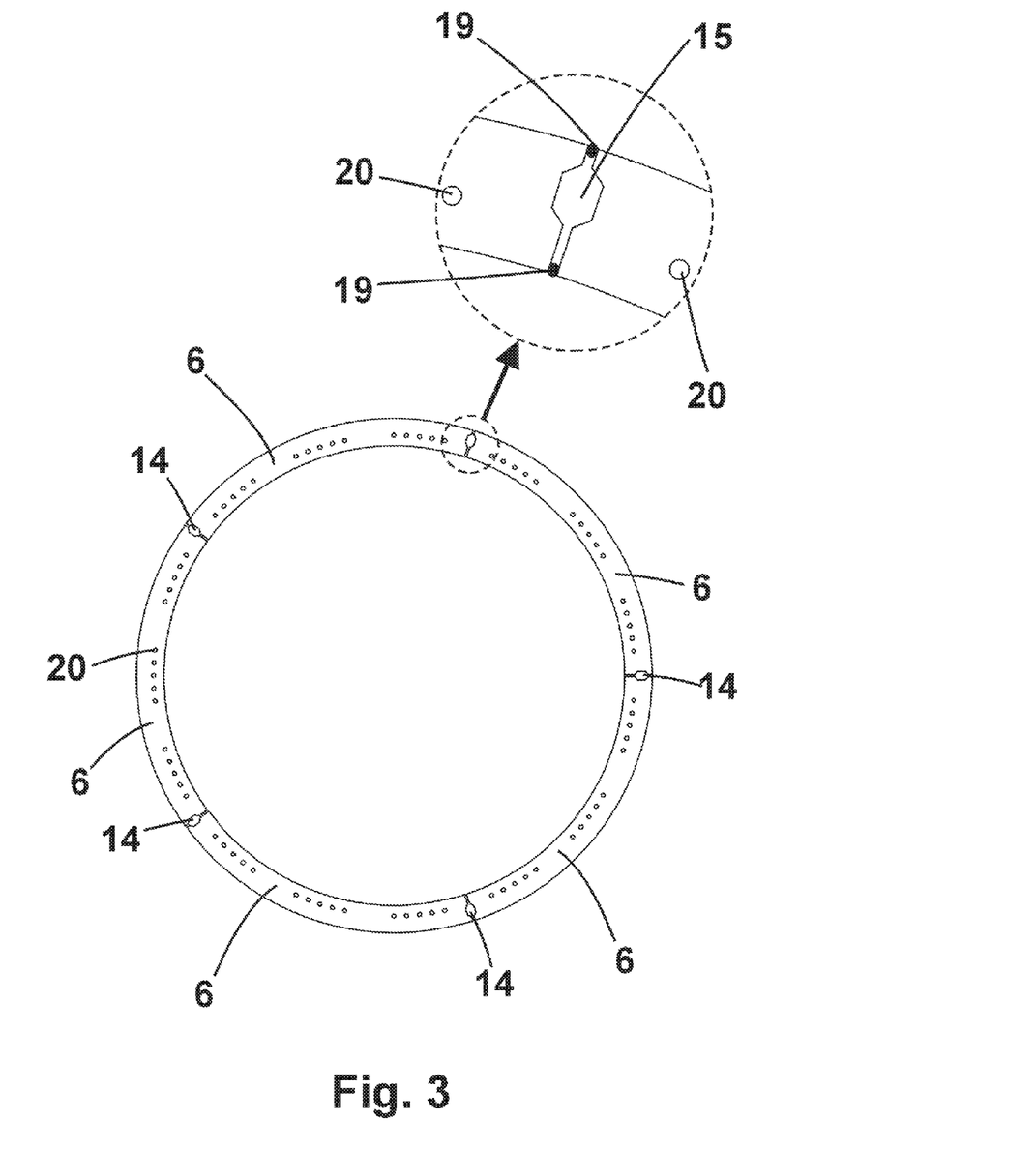
FIG. 3 shows a cross section of the base the first part of the tower, showing the five prefabricated modular elements of which it is comprised, with an enlarged detail of the closure of the lateral union between the elements.

As we have seen above, each of the prefabricated modular elements (6, 7, 8) is the right shape to form a tapered part of the tower when placed adjacently. Their external wall (9) is smooth while the internal wall (10) has numerous prominent horizontal (11) and vertical (12) reinforcement stiffeners that allow the main wall (13) of the modular elements (6,7,8) to be of limited thickness. The vertical sidewalls, of reduced width, have a groove (14) all the way up, preferably of trapezoidal section, intended for the cement union joint (15).

Figure 4:
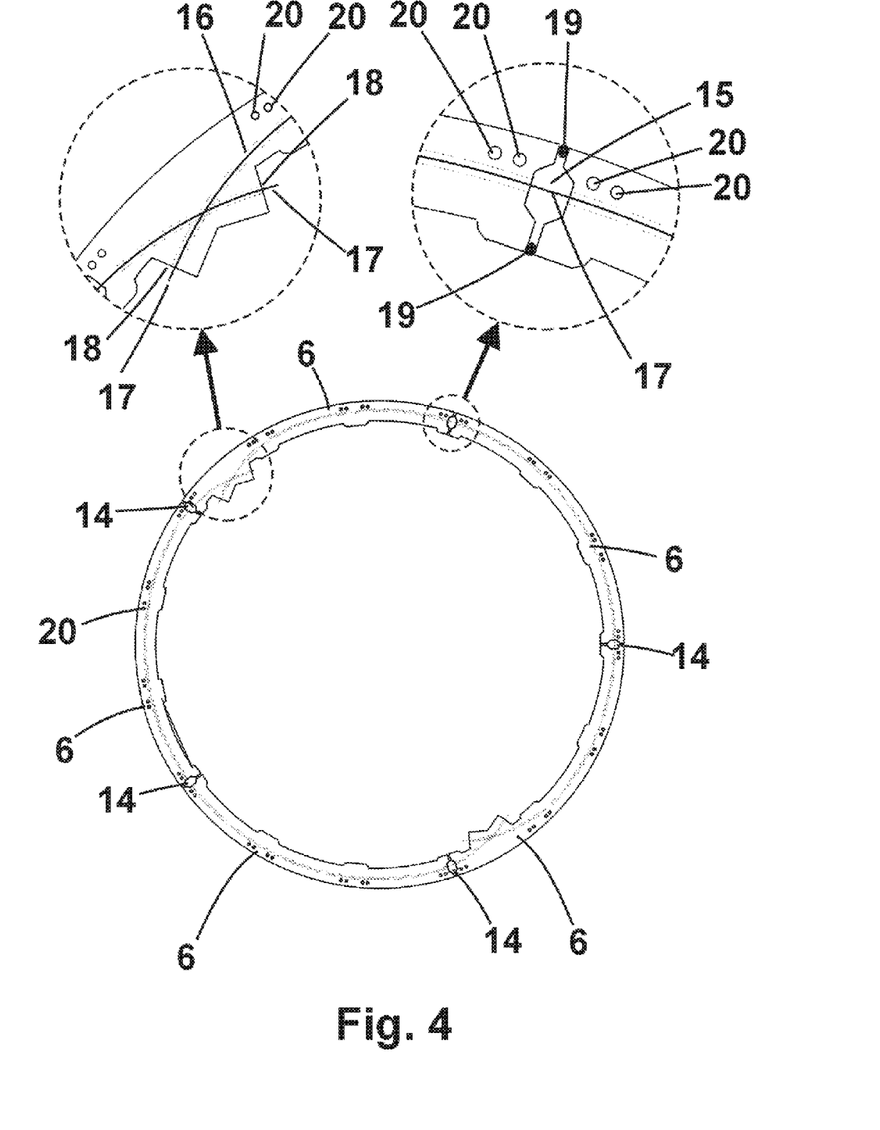
FIG. 4 shows a cross section of the first part of the tower at the level of one of the horizontal reinforcement stiffeners, showing the five prefabricated modular elements of which it is comprised, with an enlarged detail of the closure of the lateral union between the elements and a further one of the accesses for tensioning the horizontal cables.
Figure 5:
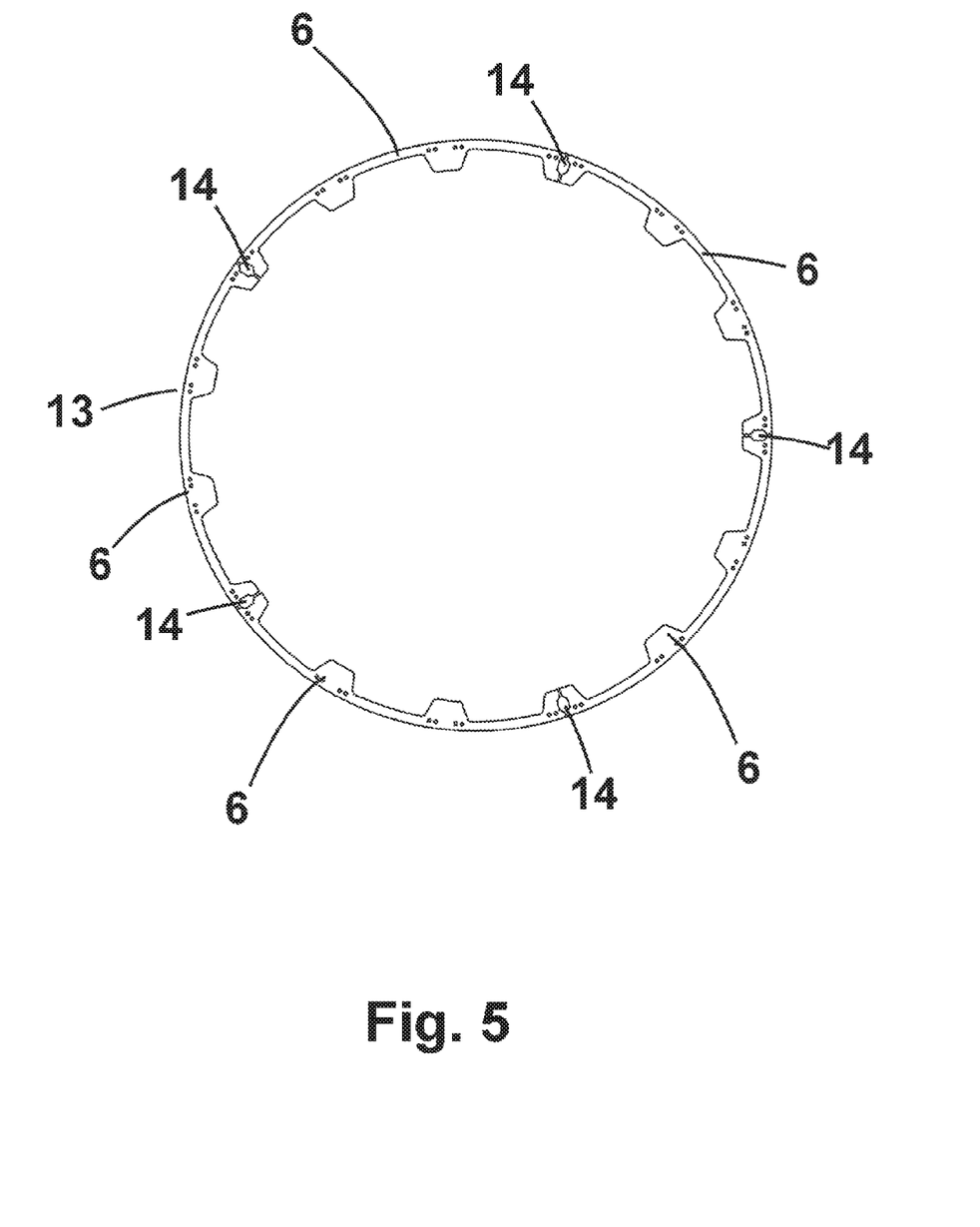
FIG. 5 shows a cross section of the first part of the tower at intermediate height, showing the five prefabricated modular elements of which it is comprised.
Figure 6:
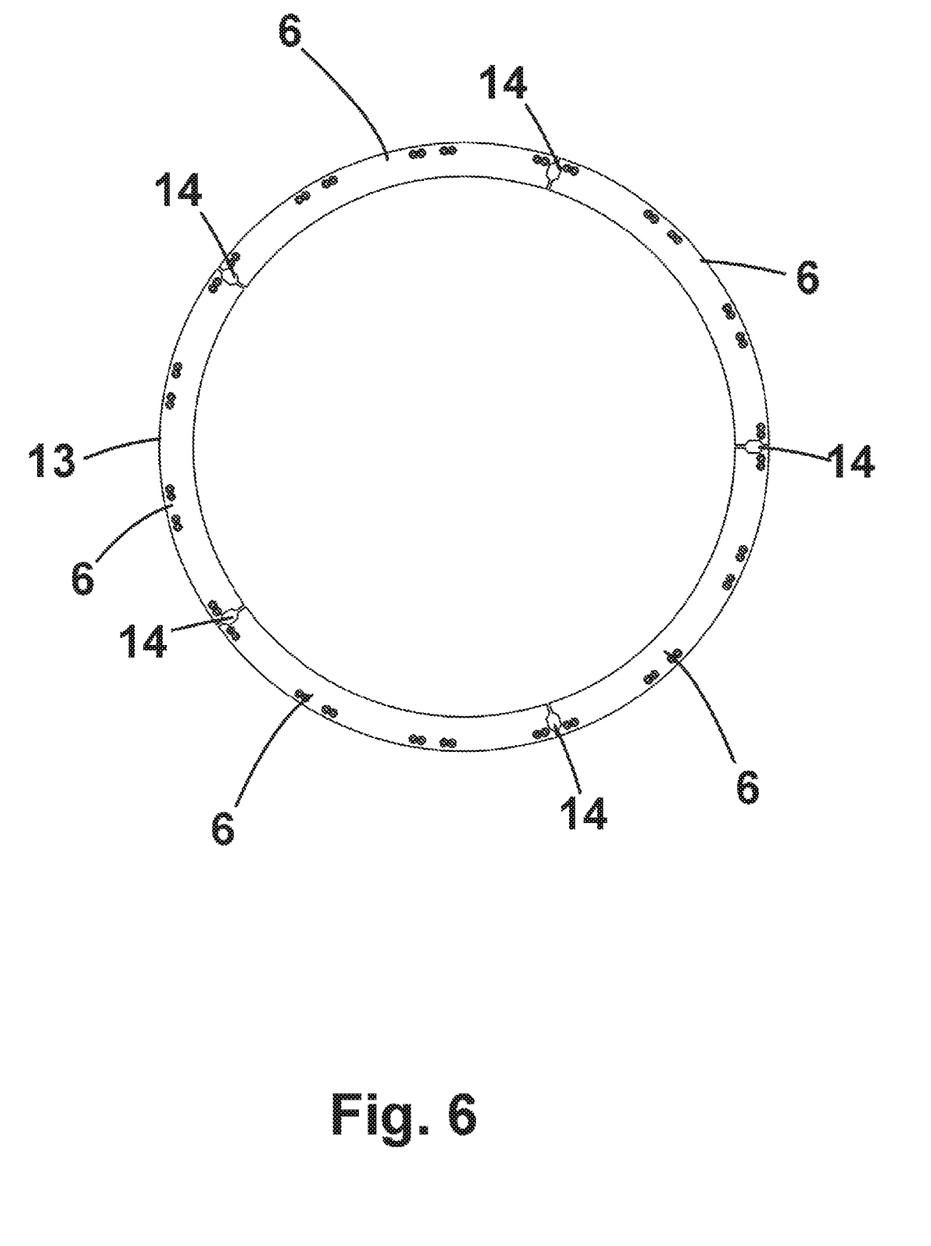
FIG. 6 shows a cross section of the base of the second part of the tower, showing the five prefabricated modular elements of which it is comprised.
Figure 7:
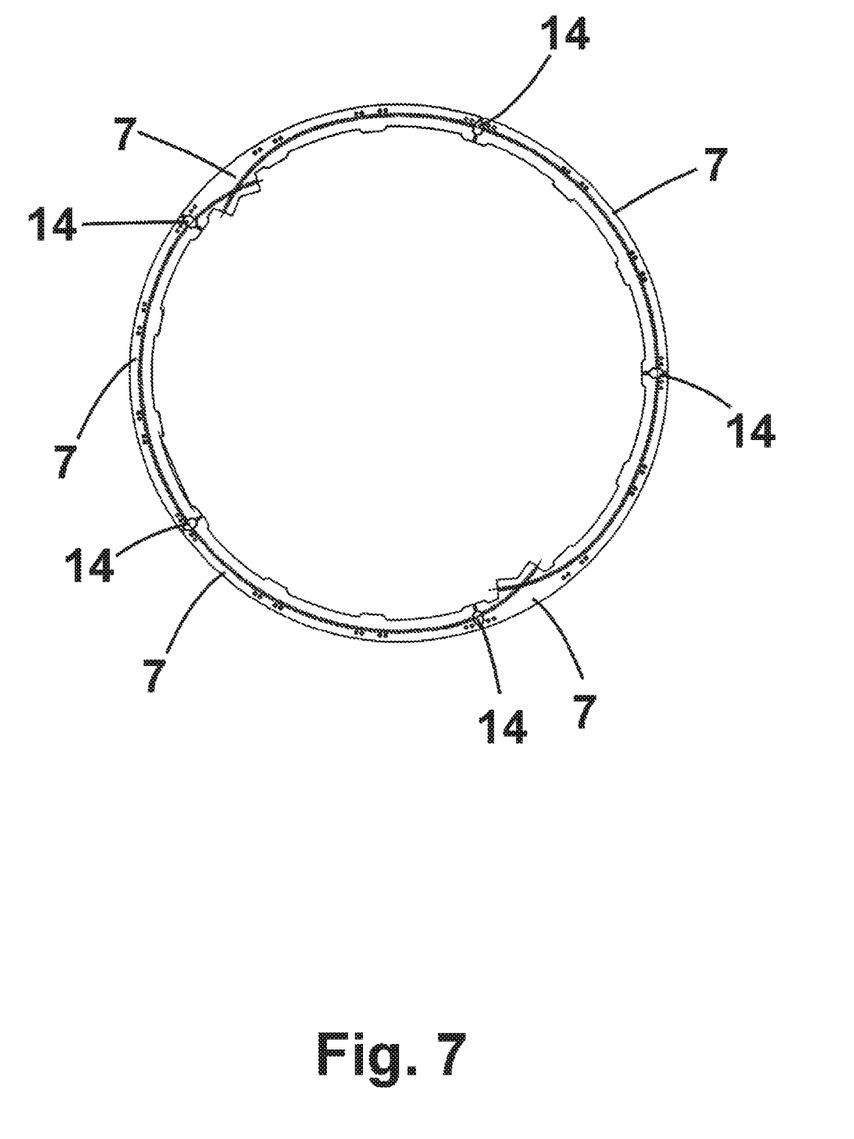
FIG. 7 shows a cross section of the second part of the tower at the height of one of the horizontal reinforcement stiffeners, showing the five prefabricated modular elements of which it is comprised.
Figure 8:
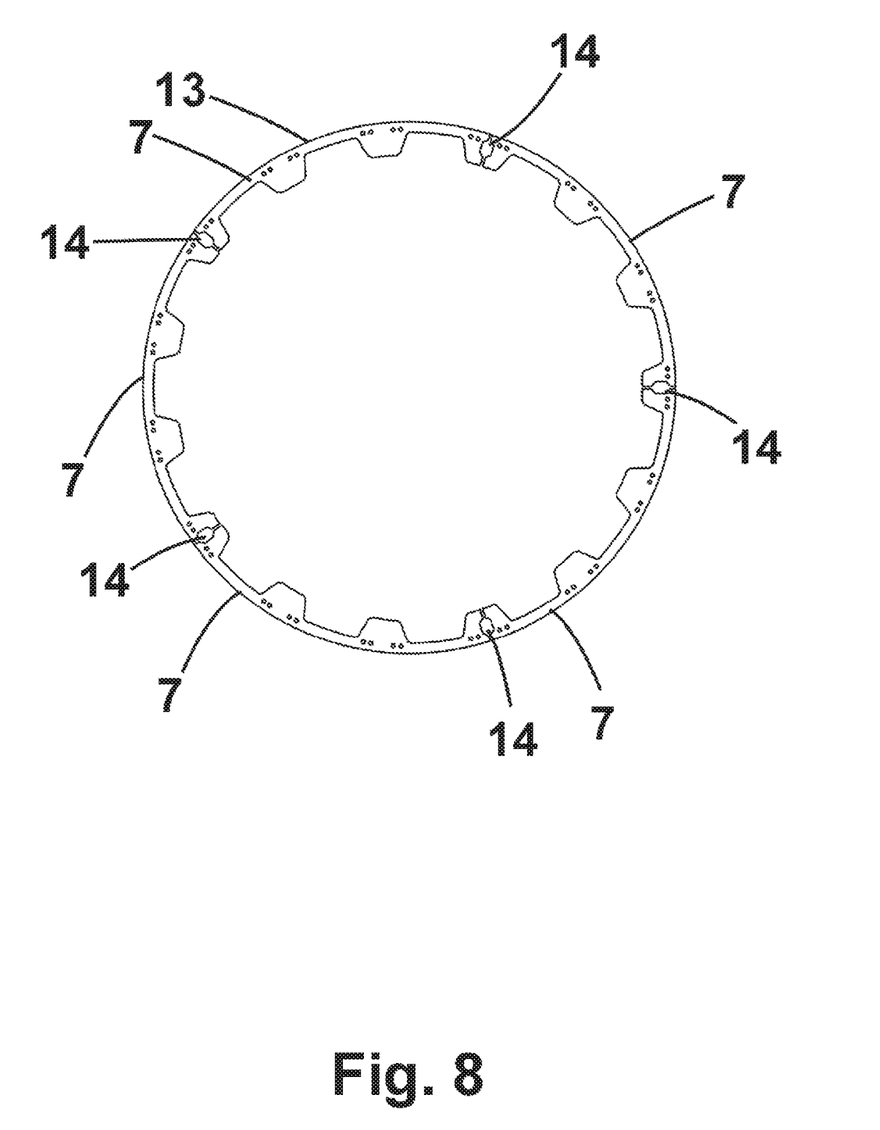
FIG. 8 shows a cross section of the second part of the tower at an intermediate height, showing the five prefabricated modular elements of which it is comprised.
Figure 9:
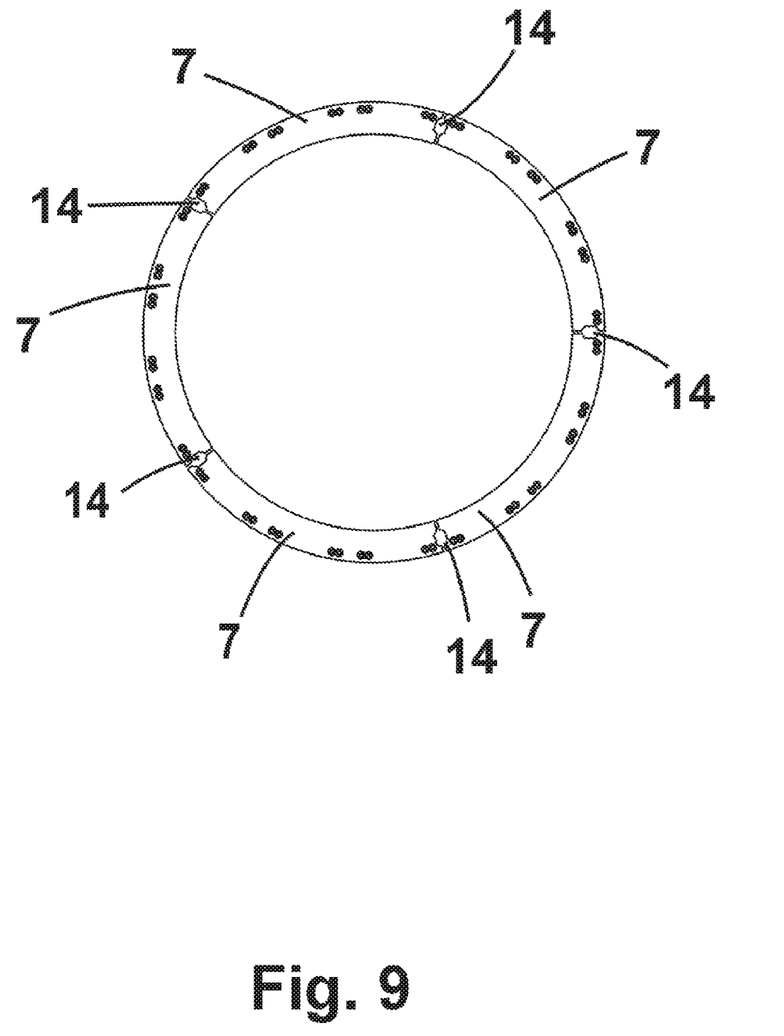
FIG. 9 shows a cross section of the terminal part of the second part of the tower, showing the five prefabricated modular elements of which it is comprised.
Figure 10:
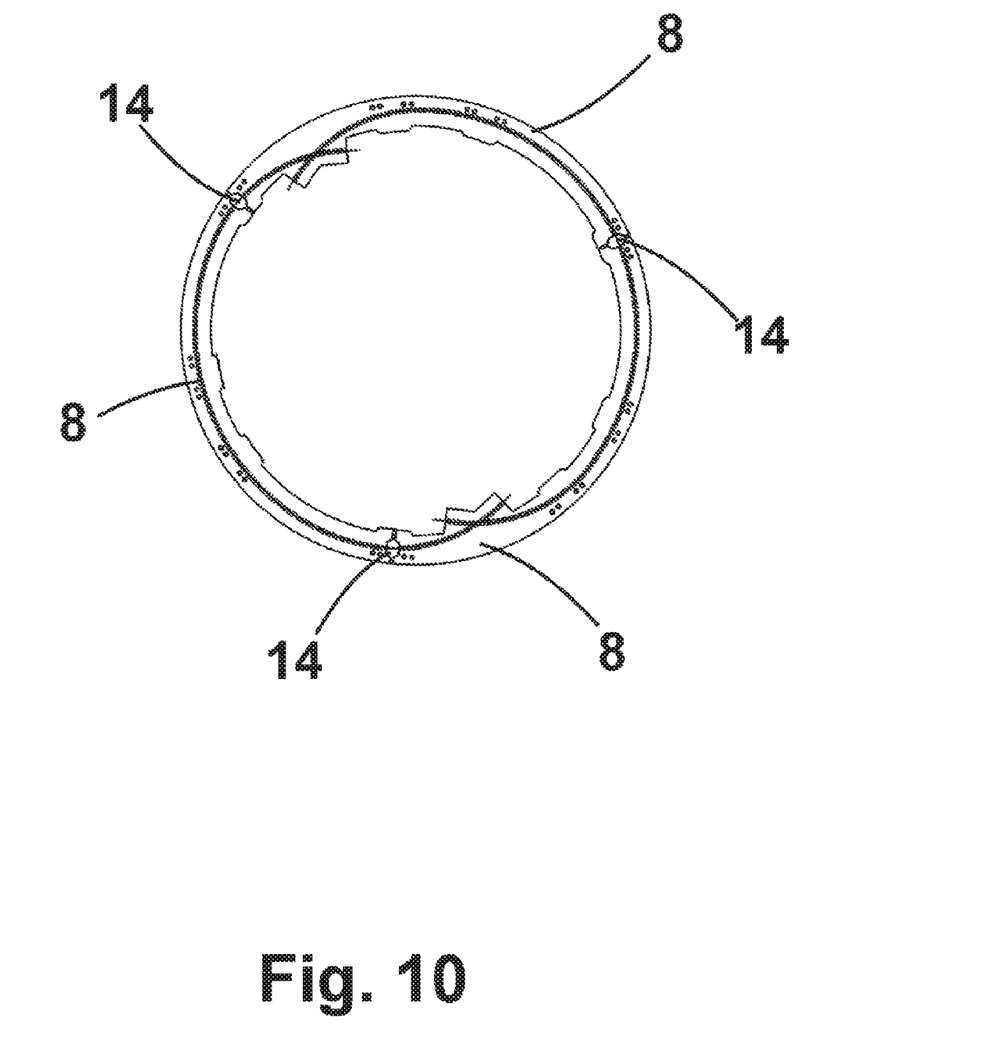
FIG. 10 shows a cross section of the third part of the tower at the height of one of the reinforcement horizontal stiffeners, showing the three prefabricated modular elements of which it is comprised.
Figure 11:
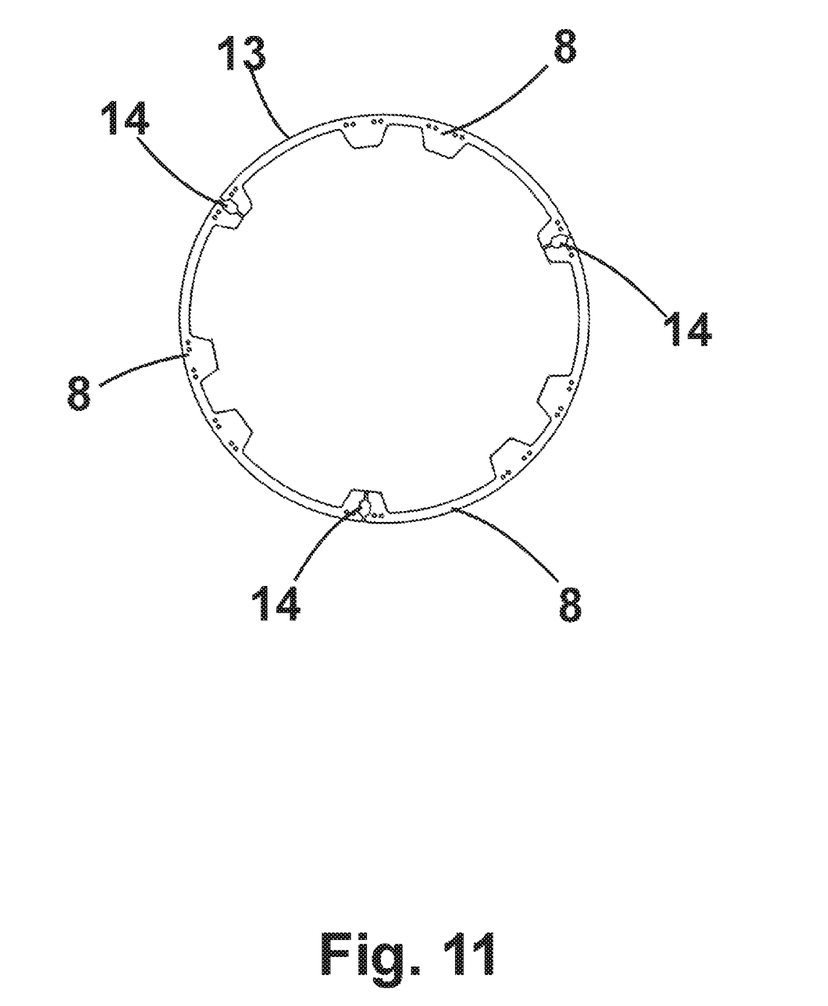
FIG. 11 shows a cross section of the third part of the tower at intermediate height, showing the three prefabricated modular elements of which it is comprised.
Figure 12:
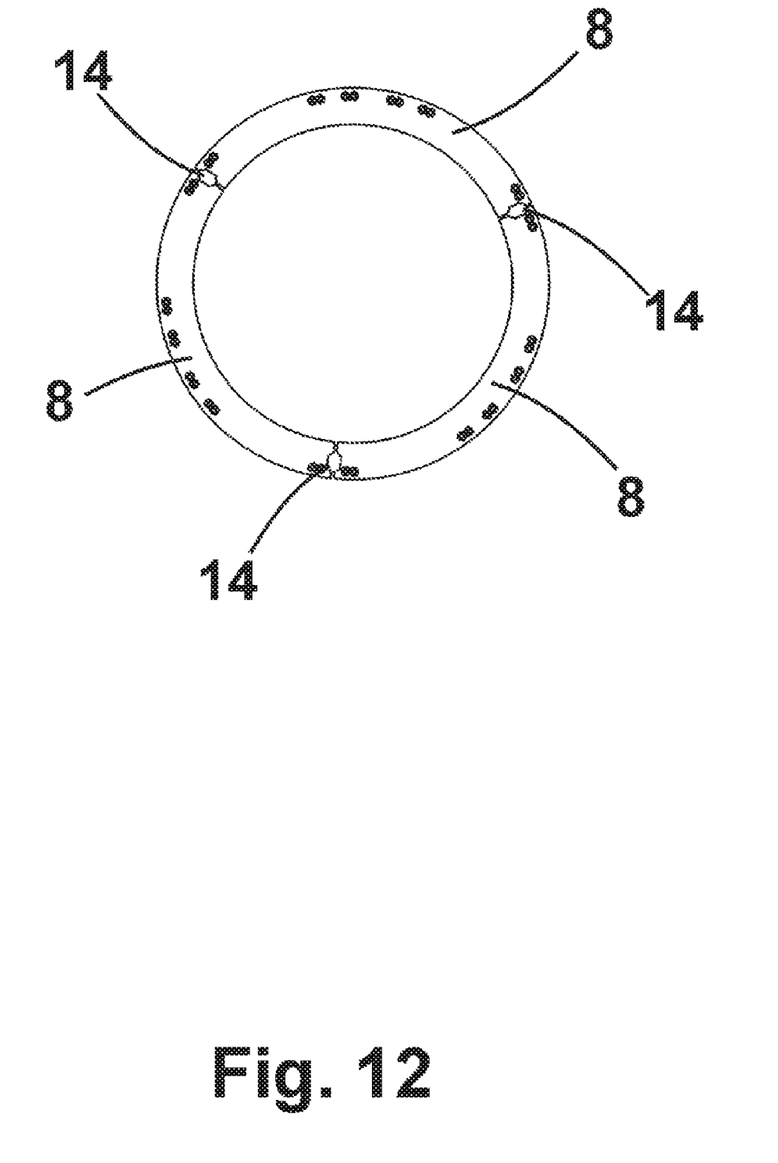
FIG. 12 shows a cross section of the end part of the third part of the tower, showing the three prefabricated modular elements of which it is comprised.
Figure 13:
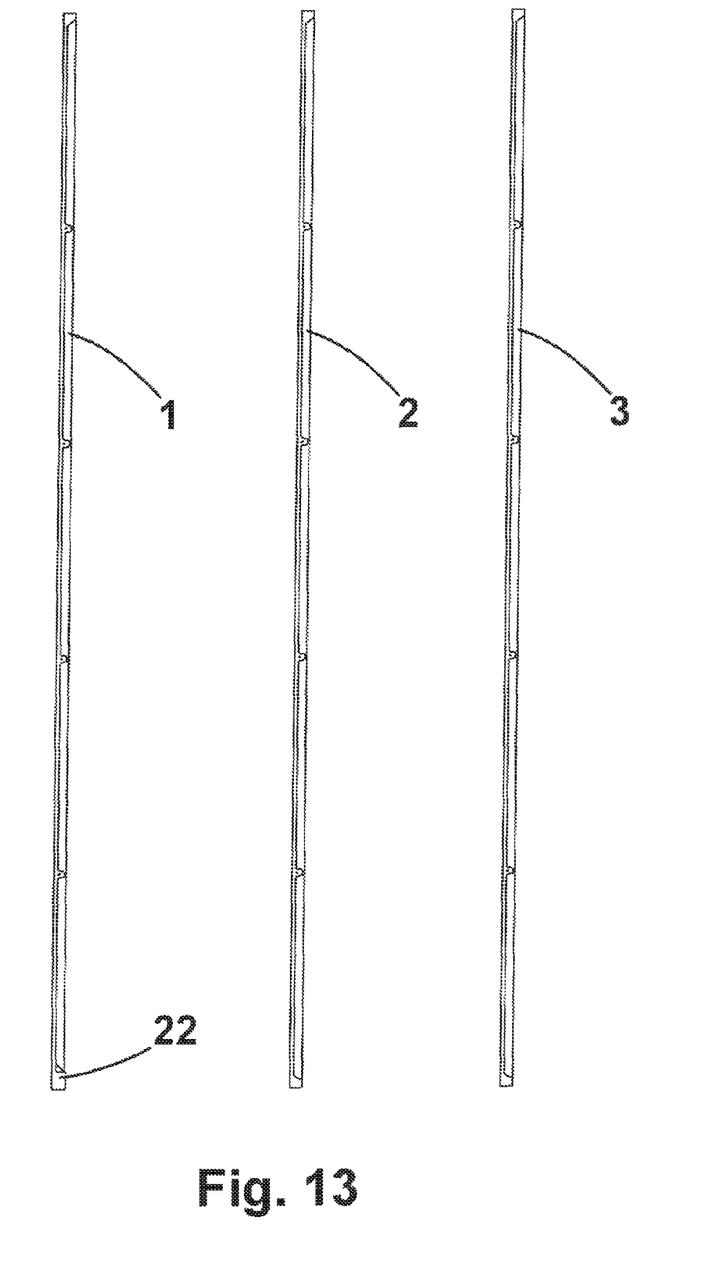
FIG. 13 shows the cross sections of the sidewalls of the three parts of the towers.

The horizontally arranged reinforcement stiffeners (11) each have a central longitudinal tube (16) running all the way along them, through which the tensioning cables (17), preferably flexible and made of steel, are passed. They provide horizontal solidarity between the prefabricated modular elements (6, 7, 8) that make up each part of the tower (4), the prefabricated modules having appropriate access openings (18) to the horizontal central tubes (16).

When the prefabricated modular elements (6, 7, 8) that make up each part of the tower (4) have been placed alongside one another and the horizontally arranged tensioning cables (17) have been tensed, the vertical union joints between each pair of modular elements (6, 7, 8) will be closed, previously sealing the joint from the outside and inside by means of a closure seal (19) and subsequently pouring a sealant, preferably of the liquid cement type (15) in the gap made by the lateral grooves of the adjacent modular elements.

Figure 14:
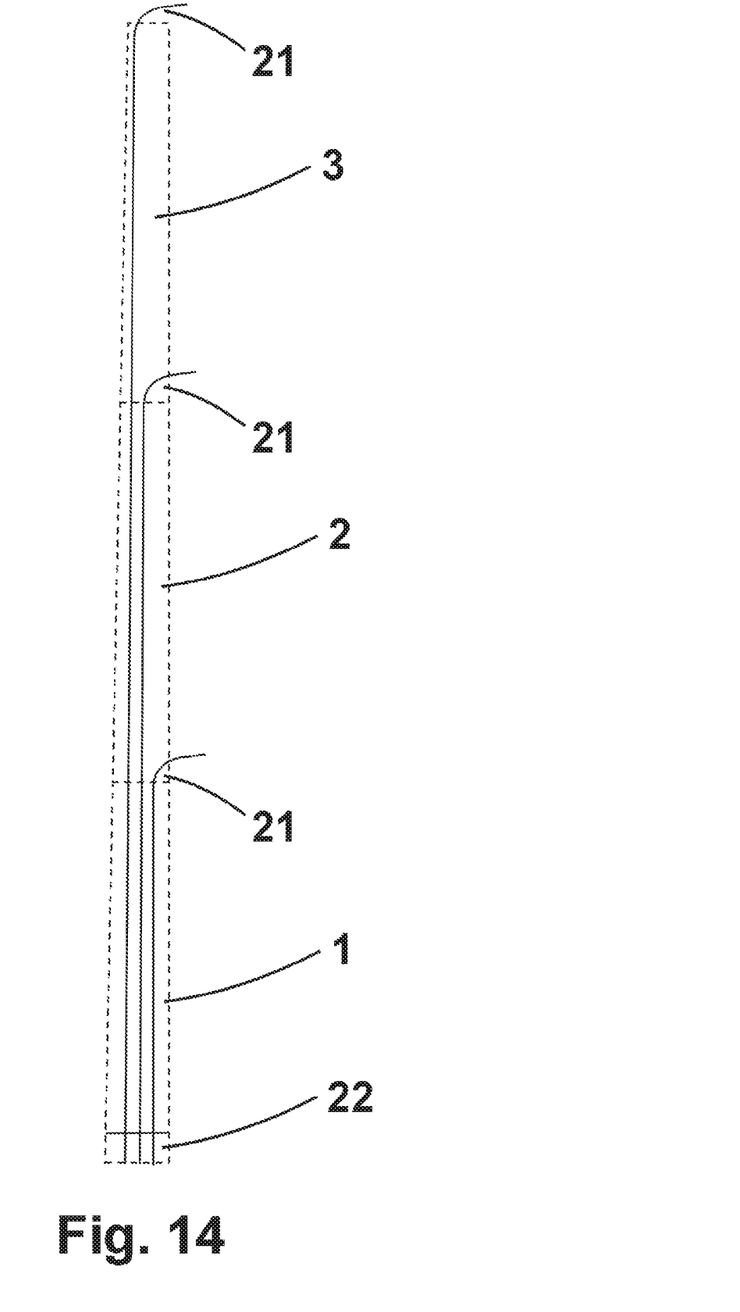
FIG. 14 shows a side cross section illustrating the course of a set of three vertical tensioning cables.

The prefabricated modular elements (6, 7, 8) also have a large number of through-tubes (20) arranged vertically along the wall (13), through which the tensioning cables (21) that provide vertical solidarization of the parts (1, 2, 3) comprising the tower, are passed. These vertical tensioning cables (21) will be installed from the lower stiffener (22) of the prefabricated modular elements (6), without having to prolong them to the foundations, that form the lower part (1) of the tower (4), passing through the through-tubes (20) that are subsequently filled with mortar, solidarizing and integrating the cables inside the through-tubes (20) and hence inside the walls (13), remaining concealed both internally and externally and being preferably installed in groups of a single cable per tower part (4) (three cables in this preferred embodiment example). In this way the vertical tensioning cables (21) are totally attached to the tower (4) all the way up.

A feature of the invention is that vertical components (1, 2, 3) of the tower are assembled on top of one another by means of a horizontal rotation equivalent to the angle distance that separates two vertical reinforcement stiffeners (12) from one another, so that the vertical jointing grooves (15) on each part between the prefabricated modular elements do not coincide vertically.

We voluntarily omit giving a detailed description of the other particularities of the system presented or its components as we consider that they are not subject to any claim.

Having described the nature and a preferred embodiment of the present invention in sufficient detail, it only remains for us to say that the description is not restrictive and some variations may be made, both with regard to materials and shapes or sizes, provided such variations do not alter the essential characteristics that are claimed below.

The invention claimed is:

1. Prefabricated modular tower, of the kind used as a support for wind generators and other applications, characterized by being formed by a small number of tapered parts, each of the tapered parts is formed by a lateral union of identical prefabricated modular elements made of reinforced concrete in the right shape to form a tapered part of the tower when placed adjacently, their external wall being smooth, characterized by an internal wall having a plurality of prominent horizontal and vertical stiffeners that reinforce a reduced-thickness main wall of the modular elements, vertical sidewalls having a groove all the way up, of trapezoidal section, intended for a cement union joint.

2. Prefabricated modular tower, as described in claim 1, characterized by the fact that the horizontally arranged reinforcement stiffeners in each of the prefabricated modular elements have a central tube running all the way along them, that allows the passage of tensioning cables, flexible and made of steel, which provide horizontal solidarity between the prefabricated modular elements that make up each part of the tower, the prefabricated modular elements having appropriate access openings to the central tubes.

3. Prefabricated modular tower, as described in claim 1, characterized by the fact that when the prefabricated modular elements that make up each part of the tower have been placed alongside one another and the horizontally arranged tensioning cables have been tensed, the union joints between each pair of modular elements are closed, previously sealing the union from the outside and inside by means of a closure joint and subsequently pouring a sealant, into the gap formed by the side grooves of the adjacent modular elements.

4. Prefabricated modular tower, as described in claim 1, characterized by the fact that the prefabricated modular elements have a plurality of through-tubes totally integrated inside the main wall and arranged vertically along it, through which the tensioning cables that together provide vertical solidarization of the parts comprising the tower, are passed, said vertical tensioning cables being installed from a lower stiffener of the prefabricated modular elements that make up the lower part of the tower, passing through the through-tubes that are subsequently filled with mortar, solidarizing and integrating the cables inside the through-tubes and thus inside the walls, remaining concealed both internally and externally and being installed in groups of a single cable per tower part.

5. Prefabricated modular tower, as described in claim 1, wherein vertical components of the tower are assembled on top of one another by means of a horizontal rotation equivalent to an angle distance that separates two vertical reinforcement stiffeners from one another, so that grooves on each part between the prefabricated modular elements do not coincide vertically.

6. Prefabricated modular tower, as described in claim 1, wherein the tower is divided in three tapered parts, with an approximate height of 30 m and 35 m each, which gives a total tower height of approximately 100 m, the lower part comprising five identical prefabricated modular elements placed alongside each other; the intermediate part comprising a further five identical prefabricated modular elements, although of smaller diameter than the previous ones, also placed alongside each other and the upper part being formed by only three prefabricated modular elements which are the same as one another but different from the previous ones.

7. A prefabricated modular tower comprising:
a bottom tapered part, a top tapered part and at least one intermediate tapered part located between and aligned with the top tapered part and the bottom tapered part; each of the tapered parts is formed by a plurality of modular elements that are located adjacent each other, the modular elements have an external wall, an inner wall and at least one side wall that extends between the external wall and the inner wall, vertical stiffeners and horizontal stiffeners that extend from the inner wall, a vertical groove in the side wall, a joint formed by the vertical grooves on adjacent sidewalls and a sealant received in the joint.

8. The prefabricated modular tower as claimed in claim 7, wherein the vertical groove is trapezoidal shaped.

9. The prefabricated modular tower as claimed in claim 7, further comprising a tensioning cable that travels through the horizontal stiffeners.

10. The prefabricated modular tower as claimed in claim 9, wherein the horizontal stiffeners of the modular elements of the same tapered part are aligned and the tensioning cable travels through the aligned horizontal stiffeners of each modular element.

11. The prefabricated modular tower as claimed in claim 9, wherein the tensioning cable is housed in a tube.

12. The prefabricated modular tower as claimed in claim 7, further comprising tubes having an inner surface and vertically extending through each of the tapered parts, tensioning cables having an exterior surface and received in the tubes wherein a space exists between the inner surface of the tubes and the exterior surface of the tensioning cables, and a means for filling the space.

13. The prefabricated modular tower as claimed in claim 7, wherein the joint includes an inner end proximate the inner walls of adjacent modular elements and an outer end proximate the external walls of adjacent modular elements, a closure seal fills the inner end and the outer end of the joint.

14. The prefabricated modular tower as claimed in claim 7, wherein the sealant is a liquid cement type.

15. The prefabricated modular tower as claimed in claim 7, wherein the modular elements are made of concrete.

* * * * *